(12) United States Patent
White

(10) Patent No.: US 7,882,029 B2
(45) Date of Patent: Feb. 1, 2011

(54) CENTRALIZED BILLING CREDIT SYSTEM UTILIZING A PREDETERMINED UNIT OF USAGE

(75) Inventor: Craig R. White, Eagle, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 1807 days.

(21) Appl. No.: 09/977,687

(22) Filed: Oct. 16, 2001

(65) Prior Publication Data

US 2003/0074312 A1    Apr. 17, 2003

(51) Int. Cl.
*G06Q 40/00* (2006.01)
(52) U.S. Cl. .................................................... 705/40
(58) Field of Classification Search ............. 705/35–40
See application file for complete search history.

(56) References Cited

U.S. PATENT DOCUMENTS

| | | | | |
|---|---|---|---|---|
| 6,216,113 B1* | 4/2001 | Aikens et al. | ............... | 705/34 |
| 6,385,675 B1* | 5/2002 | Yamaguchi | ............... | 710/72 |
| 7,034,952 B2* | 4/2006 | Okuda et al. | ............... | 358/1.15 |
| 7,190,478 B2* | 3/2007 | Caffary et al. | ............... | 358/1.15 |
| 2002/0138378 A1* | 9/2002 | Leskuski | ............... | 705/34 |
| 2003/0010818 A1* | 1/2003 | Asawaka | ............... | 235/379 |
| 2003/0050963 A1* | 3/2003 | Lamming et al. | ............... | 709/203 |

OTHER PUBLICATIONS

Oliver ; Accountant Now Writes Cgeck; Nahsville Business Journal V7 N17 s1 p8; Pub Date :910429.*
Business Wire; LCI Intermate and LCI SMARTpen; Nov. 1, 2000.*
Deerlin, Economic Aternatives to gridlock; eb. 16, 1988.*

* cited by examiner

*Primary Examiner*—Hani Kazimi
*Assistant Examiner*—Hatem Ali

(57) ABSTRACT

Disclosed is an electronic transaction recording system for accumulating data from printer devices comprising a mobile access unit containing content which is to be printed, a printer device which receives the content from the mobile access unit and prints the content in response to a authorization process, a billing manager coupled to the printer device and the mobile access unit for determining the amount of printer usage and associating a predetermined amount of token values with the costs of printing and generates an accounting of usage based on a predetermined measure of usage and a billing system for maintaining accounting records of user and associating user account information with the predetermined measure of usage and stores account information in an account records database.

11 Claims, 3 Drawing Sheets

CENTRALIZED BILLING CREDIT SYSTEM UTILIZING A PREDETERMINED UNIT OF USAGE

TECHNICAL FIELD OF INVENTION

This invention relates to a network printing system and more particularly a billing mechanism for a network printing system that employs token credits as a measurement of printer device usage.

BACKGROUND OF THE INVENTION

The prior art is replete with methods for obtaining billing information in printer systems. For example, U.S. Pat. No. 3,974,363 discloses a programmable billing system for use in a stand-alone reproduction machine. The system provides means for counting reoccurring events and generating a weighted output value proportional to the billing value of the events. It is also known, as disclosed in U.S. Pat. No. 5,305,199, to employ a single tracking system for monitoring inventories of supplies consumed by a network of reprographic machines. Furthermore, U.S. Pat. No. 6,216,113 B1 discloses a network administrator which stores data representing usage of selected printers and a decoder for validating a print job request and a billing account number. The print jobs are verified and billed to an individual or group account number.

A difficulty with the above described techniques is a lack of capability to charge individuals or groups of individuals for usage of the printers on the network. Another difficulty is the lack of a simple method to determine the measurement of the usage of the devices. For example, U.S. Pat. No. 6,216,113 B1 uses various counters and totalizers circuits which count and accumulate device usage information. The system requires at least one counter circuit for every possible operation of the device.

SUMMARY OF THE INVENTION

In one aspect, the invention is an electronic transaction recording system for accumulating data from printer devices comprising: a billing manager which controls the billing polices for each printer device, a billing system which accumulates information on the occurrence of predetermined events and generates an accounting of usage based on the accumulated information and associates the accounting of usage with a predetermined unit of usage, and a database for storing a user's account information in terms of the predetermined unit of usage. Also, the billing system periodically updates the user's account information and issues a bill to the user. Preferably, the predetermined unit of usage is a token. Also, the system may include an apparatus for associating a predetermined number of tokens for each predetermined event and receiving from each printer device the total number of predetermined events that took place at each printer device and determining the token charge and assigning the token charge to an account. Furthermore, the system may include a billing policies database, which includes billing policies for the printer devices such that each printer device uses at least one billing policy to determine the cost of each operation performed on the printer. The cost of the operation is preferably illustrated in tokens. Optionally, the system further comprises a mobile access unit coupled to the billing manager via the printer device. The mobile access unit can be a personal digital assistant, wireless telephone or mobile computer. The system may further comprise a user configuration unit coupled to the billing polices database for updating and configuring billing polices for new users. The billing manager may include at least one memory device and a processor. Also, the billing system can be either a back office billing system or an Internet Settlement Model. Furthermore, the user can authorize the charges before the document is printed and the user's identify is authenticated by the system by submitting user credentials.

In an another aspect, the invention is an electronic transaction recording system for accumulating data from printer devices comprising: a mobile access unit containing content which is to be printed, a printer device which receives the content from the mobile access unit and printing the content in response to a authorization process, a billing manager coupled to the printer device and the mobile access unit for determining the amount of printer usage and associating a predetermined amount of token values with the costs of printing, and a billing system for maintaining accounting records of user and associating user account information with the value of the tokens and storing account information in an account records database. The system may further comprise a billing policies database, which includes billing policies for the printer device such that each printer device uses at least one billing policy to determine the cost of each operation, performed on the printer. Furthermore, the mobile access unit can be a personal digital assistant, wireless telephone or mobile computer. Also, the mobile access unit transmits using a wireless link. The system may further comprise a user configuration unit coupled to the billing polices database for updating and configuring billing polices for new users. The billing system may include at least one memory device and a processor and can be either a back office billing system or an Internet Settlement Model. Also, the user can authorize the charges before the document is printed and the user's identify is authenticated by the system by submitting user credentials.

In a further aspect of the invention, the invention is a method for electronically recording transactions performed on at least one predetermined printer device, such that the printer device is coupled to an mobile access unit with transmits the content which is to be printed, comprising the steps of: transmitting a print request to the billing manager; retrieving billing policies for the printer device; indicating to a user the cost for a desired print request such that the cost is determined by associating a predetermined amount of token values with each particular operation performed by the printer; printing selected document at the predetermined printer device and generating an accounting of costs based on the usage of the predetermined printer device.

The method further comprises the step of authenticating the user's identity by transmitting user credentials to the billing manager. Also, the method illustrates wherein the billing manager associates a predetermined number of tokens for each corresponding event and tabulates the number of events that occurred during the printer operation and determining from that the token charge. The method further comprises the step of interfacing the printer device with a billing manager in such a way that allows the mobile access unit to connect with the billing manager. The method further comprises the step of sending the accounting information to a back office billing system which maintains accounting records of users and periodically issues an accounting of costs to the user. And the method further comprises the step of storing users account information in an account database and connecting the database to the billing manager.

Some of the advantages of the present invention include the user or owner of a printer device to charge for usage on their device and only be billed for their net usage. The present invention has the ability to allow individual printer devices to be configured with specific billing policies and bill users of the device according to those policies. The users are billed not only for printing documents but also finishing options such as binding, stapling and other functions. Also, the ease of the centralized control and configuration of billing parameters is a benefit. Those skilled in the art will appreciate these and other advantages and benefits of various embodiments of the invention upon reading the following detailed description of a preferred embodiment with reference to the below listed drawings.

BRIEF DESCRIPTION OF DRAWINGS

The invention is described in greater detail hereinafter, by way of example only, through description of a preferred embodiment thereof and with reference to the accompanying drawings in which.

DETAILED DESCRIPTION OF THE PREFERRED EMBODIMENT OF THE INVENTION

Figure 1:
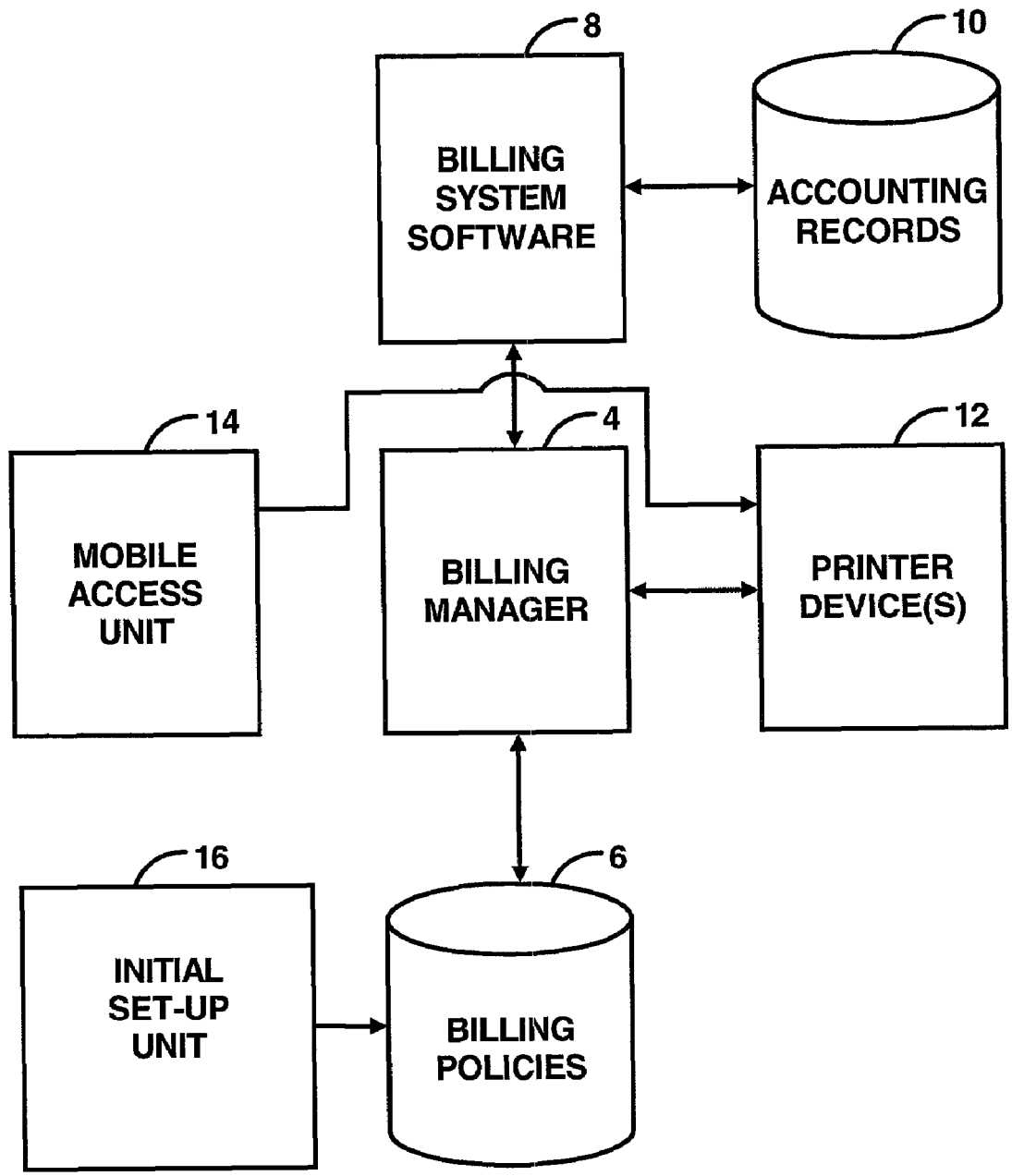
FIG. 1 is a block diagram of an automatic mobile job billing system according to an embodiment of the invention.

Referring now to the drawings and in particular FIG. 1, an exemplary embodiment of the Centralized Billing Token Credit System 2 is shown. The system 2 can be implemented using a variety of hardware platforms and includes devices for input such as a personal digital assistant (PDA) or wireless telephone, laptop computer of the like. The system 2 includes: a billing manager 4, a billing polices database 6, billing system software 8, an account records database 10, printer device (s) 12, a mobile access unit 14, and an initial setup unit 16.

The system 2 provides for the ability to configure any printer device directly with billing policies and allow any mobile user to print to devices based on those billing polices. Examples of those polices can be: classifying a printer as free, charging per page, allowing any users within an access list to print for free, charging different prices based on the user, and specific charges for finishing options such as stapling, collating, binding, printing color documents, etc.

The operation of the system 2 will be discussed with regards to FIG. 1. The user submits a job to be printed via a mobile access unit 14. Devices such as a personal digital assistant, wireless phone, or laptop computer can be employed as the mobile access unit 14. One of ordinary skill will recognize that the list is not restricted to the stated devices. As will be discussed in greater detail later, the mobile access unit 14 connects to the billing manager 4 using mobile connectivity.

The billing manager 4, manages the billing polices attributed to each printer device 12 and also contains higher level polices. For example, on policy may be to charge everyone in a given department a certain price. The billing manager 4 may also contain a system processor and a memory device (not shown). The billing manager 4 may be connected to a billing polices database 6. The billing polices database 6 may be configured to store site or location-specific billing polices. For example, the billing polices could be free or for-fee printing, billing fee per page for each type of printer, user access lists for each device and accounting location information. The billing policies database 6 can be configured for a specific department or a user basis for predetermined users. The billing manager 4 may also be connected to the printer device(s) 12. The printer device(s) 12 may be known printer units that are capable of color printing and other known printer characteristics. The printer device(s) 12 may have device-billing attributes stored locally in their processors. This allows device-specific attributes to be added to the device itself. The billing manager 4 stores these attributes and substitutes the new device-specific attributes for the previous attributes.

The billing system software 8 is coupled to the billing manager 4 by either a direct or wireless connection. This billing system software 8 is preferably a traditional back-end billing system that manages the billing transactions themselves. This could be a settlement service on the Internet or an Enterprise accounting system. These systems are well known in the art and will be discussed with more detail later. The billing system software 8 is connected to the accounts record database 10. The account records database 10 stores the billing data as a result of the printing transactions. Also, as will be discussed with regards to FIGS. 3 and 4, the account records database 10 stores the current token levels for each user and charge account information for periodic token billing resolution.

The billing system software 8 allows for the configuration of any printer device 12 directly with billing polices and allows a user to access those devices based in accordance with the billing polices. The system includes a network of printer devices 12 electronically interconnected via a network (not shown). The network could consist of a business, plurality of business or devices in a public area, such an airport or library.

Figure 2:
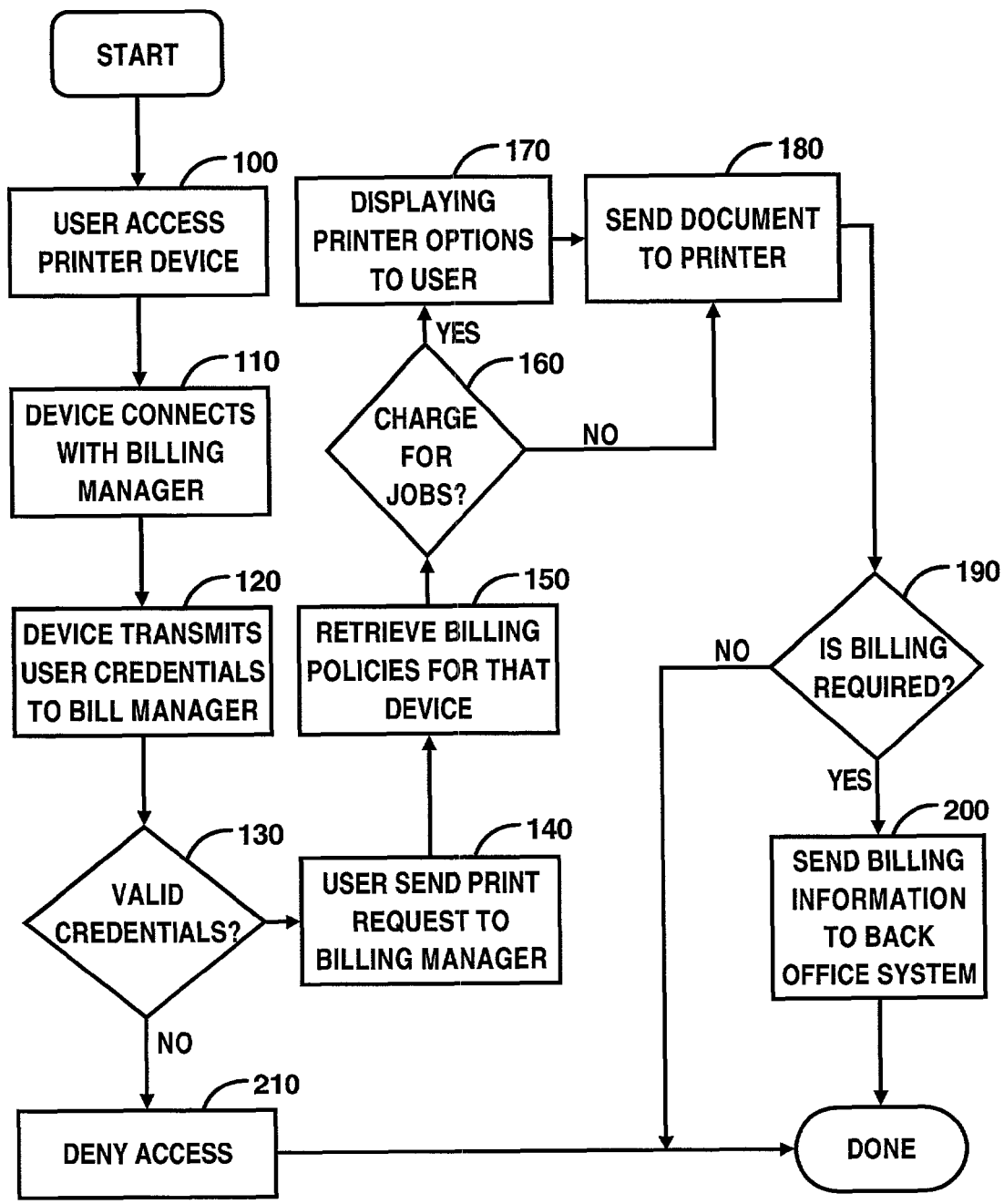
FIG. 2 is a flow chart illustrating an automatic mobile job billing method of technique in accordance with an embodiment of the invention.

A typical scenario for billing a particular print job is illustrated in FIG. 2. Initially, as shown in block 100, the user accesses the print device 12. Typically, this is carried-out as the user indicting that a printing operation is desired. The user connects to a selected printer device 12 via a mobile access device 14 or a personal computer system and indicates that there is a document or document reference which is to be printed at the printer device 12. There are various ways in which the mobile access device 14 connects to the printer device 12. First, there can be a terminal or physical connection between the devices. Second, there can be wireless access to the network, for example, using known techniques like Motorola's Bluetooth™ technology or the wireless LAN standard 802.11(b). Third, the mobile access device 14 can be connected to the printer device 12 via an infrared signal. These techniques are well known in the art.

Once the user has initiated contact with the printer device 12, as shown in block 110, the printer device 12 connects to the billing manager 4. Once the mobile access unit 14 establishes communication with the printer device 12, the printer device 12 connects to the network (not shown), allowing the user to communicate with the billing manager 4. Subsequently, the printer device 12 is connected to the billing manager 4, and the billing manager 4 prompts the user to input user credentials to authorize user access to the network as shown in block 120. User credentials can be credit card information, a digital signature, an account code, a digital certificate or user name or the like.

At block 130, the user transmits user credentials to the billing manager 4 from the mobile access unit 14. The billing manager 4 determines whether the received credentials correspond to the credentials stored in memory for this particular user as shown at block 3. If the credentials are different, then as shown in block, 210, the user is denied access to the system. If the transmitted credentials correspond, then the document to be printed or document reference is transmitted from the mobile access unit 14 to the billing manager 4. The billing manager 4 retrieves from its memory a list of all the available printer devices 12. The user then selects the printer device 12 to which the document is to be printed. The billing manager retrieves the billing polices for that printer, as shown in block 150. The billing polices are stored in the billing policies database 6.

The billing polices can be any payment mode or plan, such as whether the cost of printing is free or a specific cost per page or whether the printing is free for certain users. The billing polices are retrieved from the billing policies database 6 and stored at the billing manager 4. One of ordinary skill can easily recognize that this list is not exhaustive of the possible combinations of billing polices that can be implemented, but only an illustrative few. The polices are determined at the system initialization and stored in the database 6. If for example, a user or printer device 12 was new to system or the characteristics of a pre-existing user have changed, then a system administrator would input the new billing characteristics of the user or device into the initial setup unit 16, which could then update the billing policy database 6.

The billing manager 4 would determine whether there is a charge for printing requested by the user in block 160. If there is not, the document is sent to the printer. If there is, then the billing manager 4 transmits the computed charges to the user, as shown in block 160. The mobile access unit 14 receives the transmission from the billing manager 4 and displaying the printing fees, as shown in block 170. The billing manager 4 transmits the fee to the mobile access unit 14. Once the fees have been displayed to the user, the system prompts the user as to whether to accept the charges, as shown in block 170. If the charges are accepted, then the document is retrieved from the memory of the billing manager 4 or the document is retrieved from the location specified in the document reference and transmitted to the specified printer device 12, as shown in block 180. However, if the charges are not accepted, then the user is denied access (not shown). The charges themselves will be explained in further detail with regards to FIG. 3. The document is then printed at the printed device 12, in accordance with the specifications indicated by the user.

In block 190, the billing manager 4 determines if there is billing required for the completed printing operation. If there is no billing required, this means the printing was performed for no cost and then the operation is concluded. If there is billing required, then the billing information is determined and transmitted to back office system software 8 as shown in block 200. For example, the billing manager 4 would determine that a specific user printed a document consisting of 4 sheets of paper at 10 cents each and send that information to the back office billing system software 8, which processes the information. As stated above, the back office billing system software 8 can be a settlement service on the Internet or an Enterprise accounting system. Both systems are well known in the art. The back office billing system software 8 reconciles the present transaction with the user's account and updates the user's account information in the account records database 10.

The system of a preferred embodiment uses tokens as an arbitrary measure of the usage of the printer devices. The tokens represent the costs of predetermined printing operations. In a preferred embodiment, the tokens have no monetary value. However, one of ordinary skill in the art can envision an embodiment of the invention in which the tokens are of a form of electronic currency.

Figure 3:
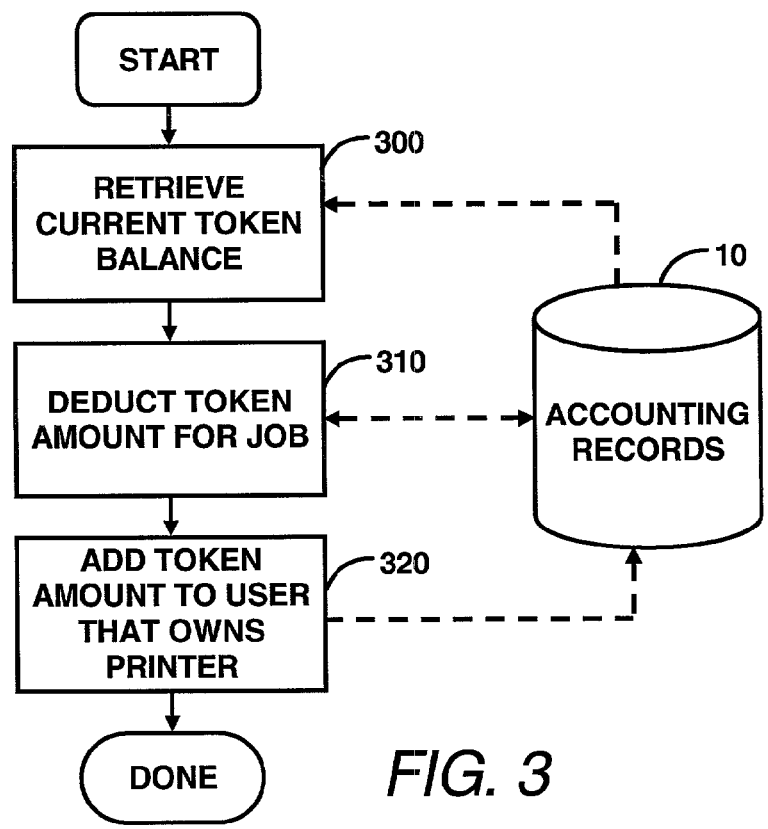
FIG. 3 is a flow chart illustrating a billing system transactions scheme in accordance with an embodiment of the invention.

The billing system transactions are shown in FIG. 3. In block 300, the billing manager 4 accesses the back office billing system software 8 to retrieve a users token balance from the user's account stored in the account records database 10. The account can be assigned to an individual, a specific department (i.e., engineering department), a plant or building. Once the print job has been performed, the corresponding amount of tokens is withdrawn from the user's account as shown in block 310. For example, an engineer travels to another plant and needs to print out slides for a presentation. The print job requires the printing of 15 slides on transparencies and 4 pages of text. The engineer is asked to accept the charges before printing. The charges are illustrated in operation per token. After the print operation has been completed, the total charges of the printing operation are computed at the device and transmitted to the billing manager 4. The billing manager 4 transmits the information to the back office billing system software 8 which accesses the current token balance for the engineer's account. The billing system 8 then deducts the token amount for the job from the engineer's account as shown in FIG. 3, block 320 block 310 and updates the account records database 14.

The owner of the printer at which the user printed the slides and text (for example, the patent attorney, but also can be any individual, a building or a department) is then credited the token amount corresponding to a token fee as shown in block 320. The token fee can be the entire cost of printing or a percentage thereof. The fee is determined by the billing policies of the printer device. The owner of this printer is then credited in the account records database 14 by the back office billing system software 8.

Figure 4:
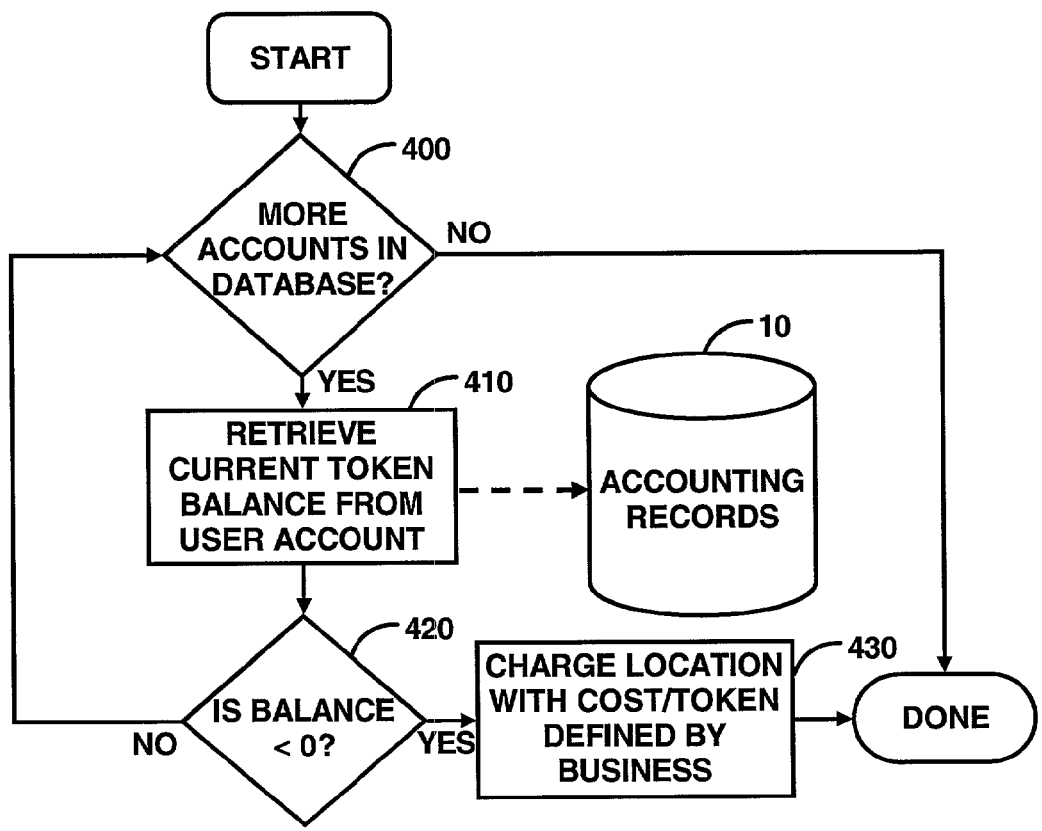
FIG. 4 is a flow chart illustrating a periodic token billing resolution scheme in accordance with an embodiment of the invention.

The billing system allows a user to print documents remotely. The system preferably keeps track of the accounts of the users and resolves the billing accounts on a periodic basis. The system allows users to generate a negative token balance. A negative token balance means performing more printing services than allocated by system for a predetermined time. If that is the case, then the user may need to pay for the costs of the excess printing services. The operation of the periodic token billing system is illustrated in FIG. 4. One of ordinary skill in the art can appreciate that this operation can be carried out randomly or on a routine basis. In block 400, the back office billing system software 8 determines the user accounts in the account records database 14. If the system finds no records, then the process is completed. However, if there are user account records, then the system retrieves the current token balance for every user account in the account records database 10, as shown in block 410. In block 420, the system then determines whether the current user account has a token balance less than 0. If that is the case, then the back office billing system software 8, charges the user the determined cost/token that been configured by the system. In one embodiment, this would be carried out by the system automatically or at the prompt of an administrator. The system would print out a bill indicating the charges to the user or electronically transmit the billing information to a designated contact person as shown in block 440 or electronically debit a pre-established account. Also, the billing may indicate a specific time period for payment and other features known to billing. If the balance is not less than zero, then system ignores that account and retrieves the next users account.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An electronic transaction recording system for accumulating data from a printer device, the system comprising:
   a billing policies database which includes billing policies for a printer device having an owner and a user;
   a billing manager which is implemented by a processor, coupled to the billing policies database and the printer device, and uses at least one of the billing polices to determine a cost of each operation performed on the printer device;
   a billing system which accumulates information on usage of the printer device by the user, generates an accounting of usage based on the information, and associates the accounting of usage with a predetermined unit of usage; and
   an account records database which stores account information of the user of the printer device in terms of the predetermined unit of usage;
   wherein the billing system periodically updates the account information of the user of the printer device and issues an accounting of costs to the user of the printer device,
   wherein the billing system credits the owner of the printer device an amount corresponding to the predetermined unit of usage of the printer device by the user, and
   wherein the billing system accumulates information on usage of the printer device by the owner of the printer device, and only bills the owner of the printer device for net usage of the printer device.

2. The system of claim 1, wherein the predetermined unit of usage is a token.

3. The system of claim 1, further comprising a mobile access unit coupled to the billing manager, wherein the mobile access unit indicates content to be printed at the printer device.

4. The system of claim 3, wherein the mobile access unit is selected from the group consisting of a personal digital assistant, a wireless telephone and a mobile computer.

5. The system of claim 1, further comprising a user configuration unit coupled to the billing polices database for updating and configuring billing polices for new users of the printer device.

6. The system of claim 1, wherein the billing system is selected from a back office billing system and an Internet Settlement Model.

7. The system of claim 1, further comprising:
   a mobile access unit containing content which is to be printed;
   wherein the system further comprises a plurality of printer devices connected over a network, wherein each printer device can receive the content from the mobile access unit and print the content in response to an authorization process; and
   wherein the billing manager is coupled to each printer device and the mobile access unit for determining an amount of printer usage and associating a predetermined amount of token values with the amount of printer usage.

8. The system of claim 7, wherein the mobile access unit is selected from a personal digital assistant, a wireless telephone, and a mobile computer.

9. The system of claim 7, wherein the mobile access unit transmits using a wireless link.

10. The system of claim 7, further comprising a user configuration unit coupled to the billing polices database for updating and configuring billing polices for new users of the printer devices.

11. The system of claim 7, wherein the billing system is selected from a back office billing system and an Internet Settlement Model.

* * * * *

UNITED STATES PATENT AND TRADEMARK OFFICE
CERTIFICATE OF CORRECTION

PATENT NO.       : 7,882,029 B2  Page 1 of 1
APPLICATION NO.  : 09/977687
DATED            : February 1, 2011
INVENTOR(S)      : Craig R. White It is certified that error appears in the above-identified patent and that said Letters Patent is hereby corrected as shown below:

In column 6, line 21, after "FIG. 3," delete "block 320".

Signed and Sealed this
Tenth Day of May, 2011

David J. Kappos
*Director of the United States Patent and Trademark Office*